United States Patent
Dearien et al.

(10) Patent No.: US 10,785,189 B2
(45) Date of Patent: Sep. 22, 2020

(54) SELECTIVE PORT MIRRORING AND IN-BAND TRANSPORT OF NETWORK COMMUNICATIONS FOR INSPECTION

(71) Applicant: Schweitzer Engineering Laboratories, Inc., Pullman, WA (US)

(72) Inventors: Jason A. Dearien, Moscow, ID (US); Rhett Smith, Odessa, FL (US); Robert Meine, Boise, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 268 days.

(21) Appl. No.: 15/909,393

(22) Filed: Mar. 1, 2018

(65) Prior Publication Data
US 2019/0273717 A1 Sep. 5, 2019

(51) Int. Cl.
*H04L 29/06* (2006.01)
*H04L 12/46* (2006.01)
(Continued)

(52) U.S. Cl.
CPC ........ *H04L 63/0209* (2013.01); *H04L 12/465* (2013.01); *H04L 12/4679* (2013.01); *H04L 43/028* (2013.01); *H04L 43/18* (2013.01); *H04L 47/20* (2013.01); *H04L 63/0245* (2013.01); *H04L 63/1408* (2013.01); *H04L 63/1416* (2013.01); *H04L 67/12* (2013.01)

(58) Field of Classification Search
None
See application file for complete search history.

(56) References Cited

U.S. PATENT DOCUMENTS 6,747,957 B1   6/2004   Pithawala
6,798,775 B1*  9/2004   Bordonaro .......... H04L 12/4641
                                                      370/392
(Continued)

FOREIGN PATENT DOCUMENTS

EP    2580894    6/2011
EP    2765751    8/2014
(Continued)

OTHER PUBLICATIONS

Braun, Wolfgang, Menth, Michael, Software-Defined Networking Using OpenFlow: Protocols, Applications and Architectural Design Choices, Future Internet, May 12, 2014.
(Continued)

*Primary Examiner* — Jason Chiang
(74) *Attorney, Agent, or Firm* — Justin K. Flanagan

(57) ABSTRACT

The present disclosure pertains to systems and methods of monitoring communication devices and communication links in a software-defined network (SDN). Network packets may be colored or tagged for routing to a packet analyzer. A VLAN bitmask may be added to a packet to identify the packet for inspection and, optionally, provide origin information identify a switch and/or port of origin. Port mirroring may be utilized and/or eventual routing of network packets to their original destination may ensure that network traffic is not disrupted. In one example, a most significant bit of a VLAN bitmask may be used by a match rule to identify packets intended for a packet analyzer without regard to original packet routing instructions and/or packet content.

10 Claims, 7 Drawing Sheets

(51) Int. Cl.
  *H04L 12/26* (2006.01)
  *H04L 12/813* (2013.01)
  *H04L 29/08* (2006.01)

(56) References Cited

U.S. PATENT DOCUMENTS

| | | | |
|---|---|---|---|
| 7,218,632 B1 | 5/2007 | Bechtolsheim | |
| 7,376,831 B2 | 5/2008 | Kollmyer | |
| 7,706,363 B1* | 4/2010 | Daniel | H04L 12/4625 370/389 |
| 7,872,983 B2 | 1/2011 | Lai | |
| 8,553,544 B2 | 10/2013 | Lai | |
| 8,800,044 B2 | 8/2014 | Raad | |
| 9,038,151 B1* | 5/2015 | Chua | H04L 45/02 709/223 |
| 9,237,129 B2 | 1/2016 | Ling | |
| 9,252,972 B1* | 2/2016 | Dukes | H04L 49/70 |
| 9,286,171 B2 | 3/2016 | Cardona | |
| 9,432,255 B1 | 8/2016 | Hasan | |
| 9,432,380 B2 | 8/2016 | Margalit | |
| 9,473,396 B1* | 10/2016 | Nittala | H04L 45/38 |
| 9,680,588 B2 | 6/2017 | Connolly | |
| 9,686,125 B2 | 6/2017 | Smith | |
| 9,769,060 B2 | 9/2017 | Dearien | |
| 9,866,483 B2 | 1/2018 | Smith | |
| 9,923,779 B2 | 3/2018 | Berner | |
| 2002/0172157 A1 | 11/2002 | Rhodes | |
| 2003/0112821 A1 | 6/2003 | Cleveland | |
| 2003/0125924 A1 | 7/2003 | Lines | |
| 2003/0133443 A1 | 7/2003 | Klinker | |
| 2003/0188159 A1 | 10/2003 | Josset | |
| 2005/0025141 A1 | 2/2005 | Chao | |
| 2005/0078672 A1 | 4/2005 | Caliskan | |
| 2005/0192008 A1 | 9/2005 | Desai | |
| 2006/0002386 A1* | 1/2006 | Yik | H04L 49/3063 370/389 |
| 2006/0206933 A1* | 9/2006 | Molen | H04L 63/0428 726/14 |
| 2008/0002579 A1* | 1/2008 | Lindholm | H04L 12/4641 370/230 |
| 2008/0005558 A1 | 1/2008 | Hadley | |
| 2008/0080384 A1 | 4/2008 | Atkins | |
| 2009/0257743 A1 | 10/2009 | Chung | |
| 2009/0285093 A1 | 11/2009 | Bolt | |
| 2009/0313189 A1 | 12/2009 | Sun | |
| 2010/0241608 A1 | 9/2010 | Huang | |
| 2011/0080829 A1* | 4/2011 | Breslin | H04L 41/0816 370/235 |
| 2011/0085567 A1 | 4/2011 | Beecroft | |
| 2011/0087952 A1 | 4/2011 | Marin | |
| 2012/0087372 A1* | 4/2012 | Narasimhan | H04L 45/245 370/392 |
| 2012/0106546 A1* | 5/2012 | Sinha | H04L 12/4666 370/389 |
| 2013/0058229 A1* | 3/2013 | Casado | H04L 45/745 370/252 |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0212285 A1 | 8/2013 | Hoffmann | |
| 2013/0250770 A1 | 9/2013 | Zou | |
| 2013/0263247 A1 | 10/2013 | Jungck | |
| 2013/0294228 A1 | 11/2013 | Ahuja | |
| 2014/0025945 A1 | 1/2014 | McGrew | |
| 2014/0029451 A1 | 1/2014 | Nguyen | |
| 2014/0064100 A1 | 3/2014 | Edwards | |
| 2014/0112130 A1 | 4/2014 | Yang | |
| 2014/0115706 A1 | 4/2014 | Silva | |
| 2014/0129700 A1 | 5/2014 | Mehta | |
| 2014/0153572 A1 | 6/2014 | Hampel | |
| 2014/0160939 A1 | 6/2014 | Arad | |
| 2014/0177428 A1 | 6/2014 | Sinha | |
| 2014/0226467 A1 | 8/2014 | Park | |
| 2014/0241345 A1 | 8/2014 | DeCusatis | |
| 2014/0245387 A1 | 8/2014 | Colpo | |
| 2014/0280834 A1 | 9/2014 | Medved | |
| 2014/0280838 A1* | 9/2014 | Finn | H04L 49/00 709/223 |
| 2014/0325038 A1 | 10/2014 | Kis | |
| 2014/0325649 A1 | 10/2014 | Zhang | |
| 2014/0371941 A1 | 12/2014 | Keller | |
| 2014/0376406 A1 | 12/2014 | Kim | |
| 2015/0081762 A1 | 3/2015 | Mason | |
| 2015/0112933 A1 | 4/2015 | Satapathy | |
| 2015/0195190 A1 | 7/2015 | Shah Heydari | |
| 2015/0312658 A1 | 10/2015 | Winzer | |
| 2015/0363522 A1 | 12/2015 | Maurya | |
| 2016/0043996 A1 | 2/2016 | Syed Mohamed | |
| 2016/0119299 A1 | 4/2016 | Amulothu | |
| 2016/0142021 A1 | 5/2016 | de los Reys | |
| 2016/0165454 A1 | 6/2016 | Li | |
| 2016/0205071 A1* | 7/2016 | Cooper | H04L 12/6418 726/1 |
| 2016/0330076 A1 | 11/2016 | Tiwari | |
| 2016/0337247 A1 | 11/2016 | Yao | |
| 2016/0344592 A1 | 11/2016 | Cook | |
| 2017/0026225 A1 | 1/2017 | Smith | |
| 2017/0026226 A1 | 1/2017 | Grussling | |
| 2017/0026243 A1 | 1/2017 | Berner | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |
| 2017/0063682 A1 | 3/2017 | Lentczner | |
| 2017/0126588 A1* | 5/2017 | Anand | H04L 49/30 |
| 2017/0208037 A1* | 7/2017 | Hay | H04L 63/1416 |
| 2017/0346731 A1* | 11/2017 | Pukhraj Jain | H04L 45/38 |
| 2017/0353478 A1* | 12/2017 | Ishikawa | H04L 12/4666 |
| 2018/0159801 A1* | 6/2018 | Rajan | H04L 49/70 |
| 2018/0331946 A1* | 11/2018 | Olofsson | H04L 45/302 |

FOREIGN PATENT DOCUMENTS

| | | |
|---|---|---|
| KR | 20150051107 | 5/2015 |
| WO | 2015038040 | 3/2015 |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

PCT/US2019/016875 Patent Cooperation Treaty, International Search Report and Written Opinion of the International Searching Authority, dated Apr. 24, 2019.

* cited by examiner

SELECTIVE PORT MIRRORING AND IN-BAND TRANSPORT OF NETWORK COMMUNICATIONS FOR INSPECTION

TECHNICAL FIELD

The present disclosure relates to systems and methods for managing network security in a software-defined network ("SDN"). More particularly, but not exclusively, the techniques disclosed in the present application allow a system to tag (or "color") packets for inspection and provide packet origination information to a packet analyzer.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Figure 1:
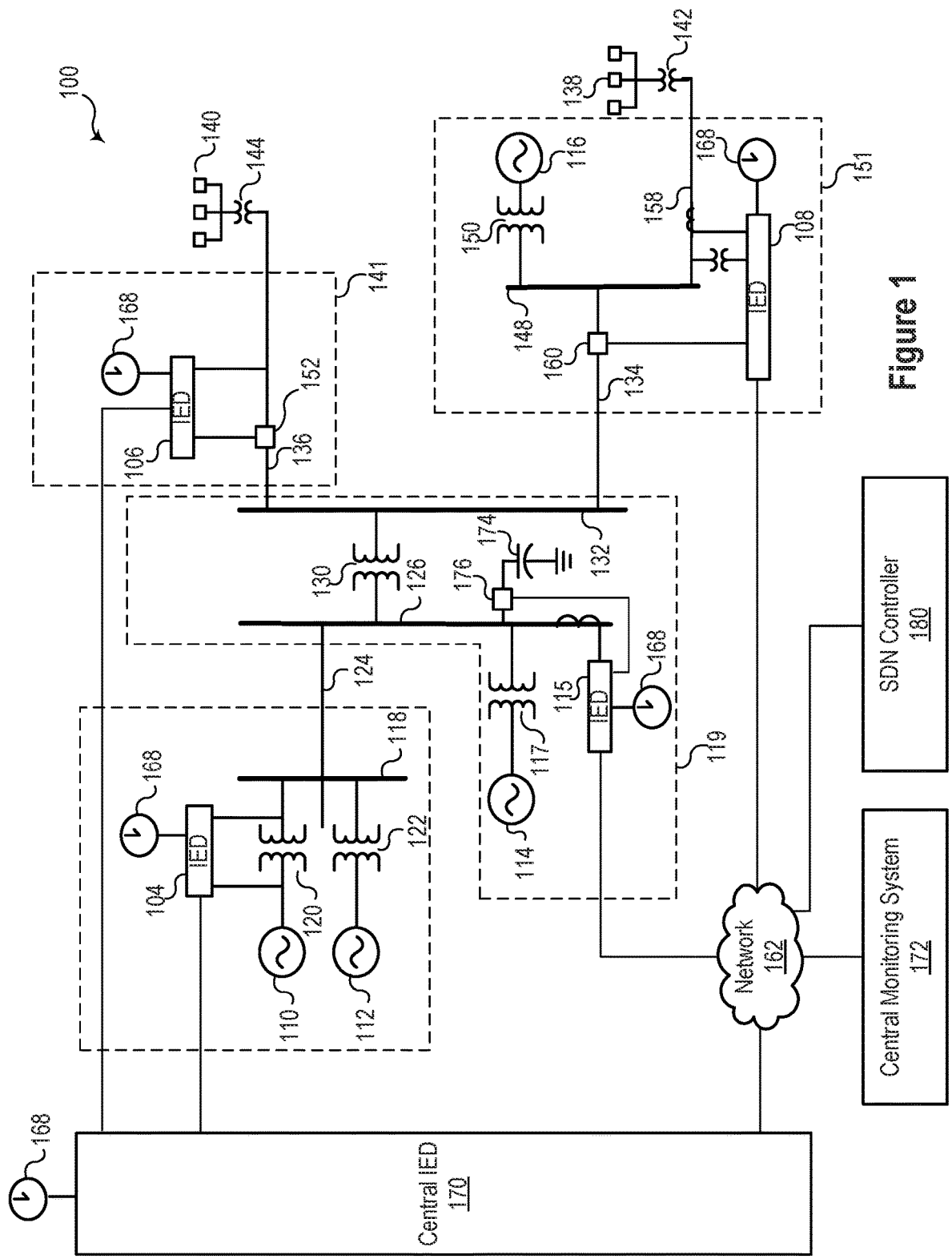
FIG. 1 illustrates an example of a simplified one-line diagram of an electric power transmission and distribution system in which a plurality of communication devices facilitate communication in a software-defined network ("SDN").

A wide variety of commercial and industrial institutions utilize software-defined networks ("SDNs"). The systems and methods described herein can be used in a wide variety of applications and are not limited to any particular industry. Some of the specific examples provided herein relate to electric power transmission and distribution systems that incorporate SDN networking technologies.

For example, modern electric power distribution and transmission systems incorporate a variety of communication technologies to monitor and protect the system. The system may utilize the communication equipment to facilitate an exchange of data among a variety of devices that monitor conditions on the power system and implement control actions to maintain the stability of the power system. The communication networks carry information useful for the proper assessment of power system conditions and for implementing control actions based on such conditions. It is generally desirable for monitoring and/or control system to respond quickly to changes in conditions in an electric power transmission and distribution system. Accordingly, it may be useful for messages transmitted via a communication network to be routed to their destinations within a specific time frame.

In various embodiments, a controller may be used to configure networking devices, establish network flows, and monitor network conditions. SDN networking technologies offer a variety of advantages to electric power systems. For example, SDN networking technologies allow for rapidly configurable deny-by-default security, better latency control, symmetric transport capabilities, redundancy and failover planning, etc.

An SDN supports a programmatic change control platform that allows an entire communication network to be managed as a single asset, simplifies the understanding of the network, and enables continuous monitoring of a network. In an SDN, the systems that decide where the traffic is routed (i.e., the control plane) can be distinct from the systems that perform the forwarding of the traffic in the network (i.e., the data plane).

The control plane may be modified to achieve an optimal or target usage of network resources by creating specific data flows through the communication network. A "flow entry" is used to refer to the set or sets of parameters the control data flows. A "data flow," or simply "flow," is used to refer to any type of data transfer in a network, such as a set or sequence of IP packets sent from a particular source to a particular unicast, anycast, or multicast destination. Data flow entries may permit specific network paths based on a variety of criteria that offer significant and precise control to operators of the network. By contrast, in large traditional networks, trying to match a network discovered path with an application desired data path may be a challenging task involving changing configurations in many devices. To compound this problem, the management interfaces and feature sets used on many devices are not standardized.

Significant complexity in managing a traditional network in the context of an electric power transmission and distribution system arises from the fact that each network device (e.g., a switch or router) has control logic and data forwarding logic integrated. For example, in a traditional network router, routing protocols such as Routing Information Protocol (RIP) or Open Shortest Path First (OSPF) constitute the control logic that determines how a packet should be forwarded. Routing tables identify the network path for forwarding packets within the network as set forth by a routing protocol. Similarly, in a Layer 2 device such as a network bridge (or network switch), configuration parameters and/or a Spanning Tree Algorithm (STA) provide control logic that determines the path of the packets. Thus, the control plane in a traditional network is distributed in the switching fabric (network or networking devices). Consequently, changing the forwarding behavior of a network involves changing configurations of many (potentially all) networking devices individually rather than programmatically through a centralized control plane.

In many SDN embodiments, an SDN controller embodies the network control plane and determines how packets (or frames) should flow (or be forwarded) in the network. The SDN controller communicates this information to the networking devices in the data plane by setting their forwarding tables and/or other configuration settings. Accordingly, an SDN enables centralized configuration and management of a network. The data plane in an SDN includes packet forwarding devices with communication interfaces to receive forwarding information from the controller.

One approach to differentiate and forward packets includes VLAN tagging. A Virtual Local Area Network (VLAN) can segregate traffic in a network with shared topology. Packets may have a VLAN ID or tag to indicate to where the packet should be forwarded. In addition to simplifying management of a network, an SDN architecture also enables monitoring and troubleshooting features that can be beneficial for use in an electric power distribution system.

In some embodiments, a system may utilize various SDN features to monitor a physical and/or logical communication link in the network. A logical communication link may encompass any number of physical links and forwarding elements used to make a connection between the communicating hosts. The physical links and forwarding elements used to create a specific communication path embodying a logical communication link may be adjusted and changed based on conditions in the network.

In Ethernet networks, it may be desirable for network operators to gain insight into the network traffic. The network may route traffic through an Intrusion Detection System (IDS) and/or a Deep Packet Inspection (DPI) system. Port mirroring may direct network traffic to an IDS or a DPI system, wherein a network switch copies packets passing through a switch port and send the copied packets to the IDS or the DPI system. A matching system may identify a packet for inspection based on a match rule. The networking device (e.g., a network switch) may "tag" or "color" the matched packet to identify it for routing to the IDS or the DPI system for analysis. Any of a wide variety of matching algorithms may be utilized and may vary depending on the desired level of network security. Matching algorithms to identify packets for inspection are widely understood and adaptable for use in conjunction with the systems and methods described herein. A packet inspector may be a processor-based device, independent of or integrated as part of a networking device, to implement a matching algorithm identifying a packet for packet inspection via an IDS or DPI system. However, so as not to obscure the description of the systems and methods set forth herein, the details of such matching algorithms are omitted from this disclosure. Once a packet is "matched" for further inspection or analysis, the systems and methods described herein allow for dynamic port mirroring and/or routing to an IDS or DPI system.

A variety of communication devices may utilize the various embodiments described herein. A communication device, as the term is used herein, includes any device that is capable of accepting and forwarding data traffic in a data communication network. In addition to the functionality of accepting and forwarding data traffic, communication devices may also perform a wide variety of other functions and may range from simple to complex devices.

Specific examples of communication devices applicable to the systems and methods described herein include, but are not limited to switches, hubs, repeaters, gateways, routers, network bridges, modems, wireless access points, and line drivers. As used herein the term "communication device" may, as the context allows, also encompass a wide variety of hybrid networking devices such as multilayer switches, protocol converts, terminal adapters, bridge routers, proxy servers, firewall devices, network address translators, multiplexers, network interface controllers, and the like. Thus, while many of the principles of the systems and methods are described herein using a network switch as an example, it is appreciated that such principles may be adapted for use with many other networking device types.

The embodiments of the disclosure can be further understood by reference to the drawings, wherein like parts are designated by like numerals throughout. Components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. Also, the steps of a method do not necessarily need to be executed in any specific order, or even sequentially, nor need the steps be executed only once unless otherwise specified.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates an example of an embodiment of a simplified one-line diagram of an electric power transmission and distribution system 100 in which a plurality of communication devices may facilitate communication in a software-defined network. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

The substation 119 may include a generator 114, which may be a distributed generator, connected to a bus 126 through a step-up transformer 117. A step-down transformer 130 connects the bus 126 to a distribution bus 132. Various distribution lines 136 and 134 may be connected to the distribution bus 132. The distribution line 136 may lead to a substation 141, and an IED 106 may monitor and/or control the distribution line 106. For example, the IED 106 may selectively open and close breaker 152. The distribution line 136A may feed load 140. An additional step-down transformer 144 is shown in communication with the distribution bus 132 via the distribution line 136 and may be used to step down a voltage for consumption by the load 140.

The distribution line 134 may lead to a substation 151, and deliver electric power to a bus 148. The bus 148 may also receive electric power from a distributed generator 116 via a transformer 150. A distribution line 158 may deliver electric power from the bus 148 to a load 138, and may include another step-down transformer 142. A circuit breaker 160 may selectively connect the bus 148 to the distribution line 134. An IED 108 may monitor and/or control the circuit breaker 160 as well as the distribution line 158.

A central monitoring system 172 and the intelligent electronic devices (IEDs), such as the IEDs 104, 106, 108, 115, and 170, may monitor, control, automate, and/or protect the electric power delivery system 100. In general, an electric power generation and transmission system may utilize IEDs for protection, control, automation, and/or monitoring of equipment. For example, the system may use IEDs to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a network 162 or using a common time source, such as a Global Navigation Satellite System ("GNSS"), or the like.

According to various embodiments, a central monitoring system 172 may comprise one or more of a variety of types of systems. For example, the central monitoring system 172 may include a supervisory control and data acquisition (SCADA) system and/or a wide-area control and situational awareness (WACSA) system. A central IED 170 may be in communication with the various IEDs 104, 106, 108, and 115. IEDs 104, 106, 108 and 115 may be remote from the central IED 170, and may communicate over various media such as a direct communication from IED 106 or over a communications network 162. According to various embodiments, certain IEDs may be in direct communication with other IEDs (e.g., IED 104 is in direct communication with central IED 170) or may be in communication via a network 162 (e.g., IED 108 is in communication with central IED 170 via communication network 162).

Networking devices including, but not limited to, multiplexers, routers, hubs, gateways, firewalls, and switches may be used to facilitate the network 162. In some embodiments, IEDs and network devices may comprise physically distinct devices. In other embodiments, IEDs and network devices may be composite devices or may be configured in a variety of ways to perform overlapping functions. IEDs and network devices may comprise multi-function hardware (e.g., processors, computer-readable storage media, communications interfaces, etc.) that can be utilized to perform a variety of tasks that pertain to network communications and/or operation of equipment within system 100.

An SDN controller 180 may be configured to interface with equipment in the network 162 to create an SDN that facilitates communication between the various IEDs 170, 115, and 108, the monitoring system 172, and/or other networked devices. In various embodiments, the SDN controller 180 may be configured to set flow entries for controlling data flow in the network 162.

In various embodiments, the SDN controller may implement an SDN application configured to allow dynamic port mirroring. In various embodiments, the system (or a user) may utilize the SDN application to selectively mirror one or more flows from one or more networking devices. In some embodiments, the SDN application causes one of the ports on a plurality of networking devices to act as a "sniffing port" that is only used to forward packets tagged or colored for inspection to a packet analyzer device, such as an IDS or a DPI system.

Figure 2:
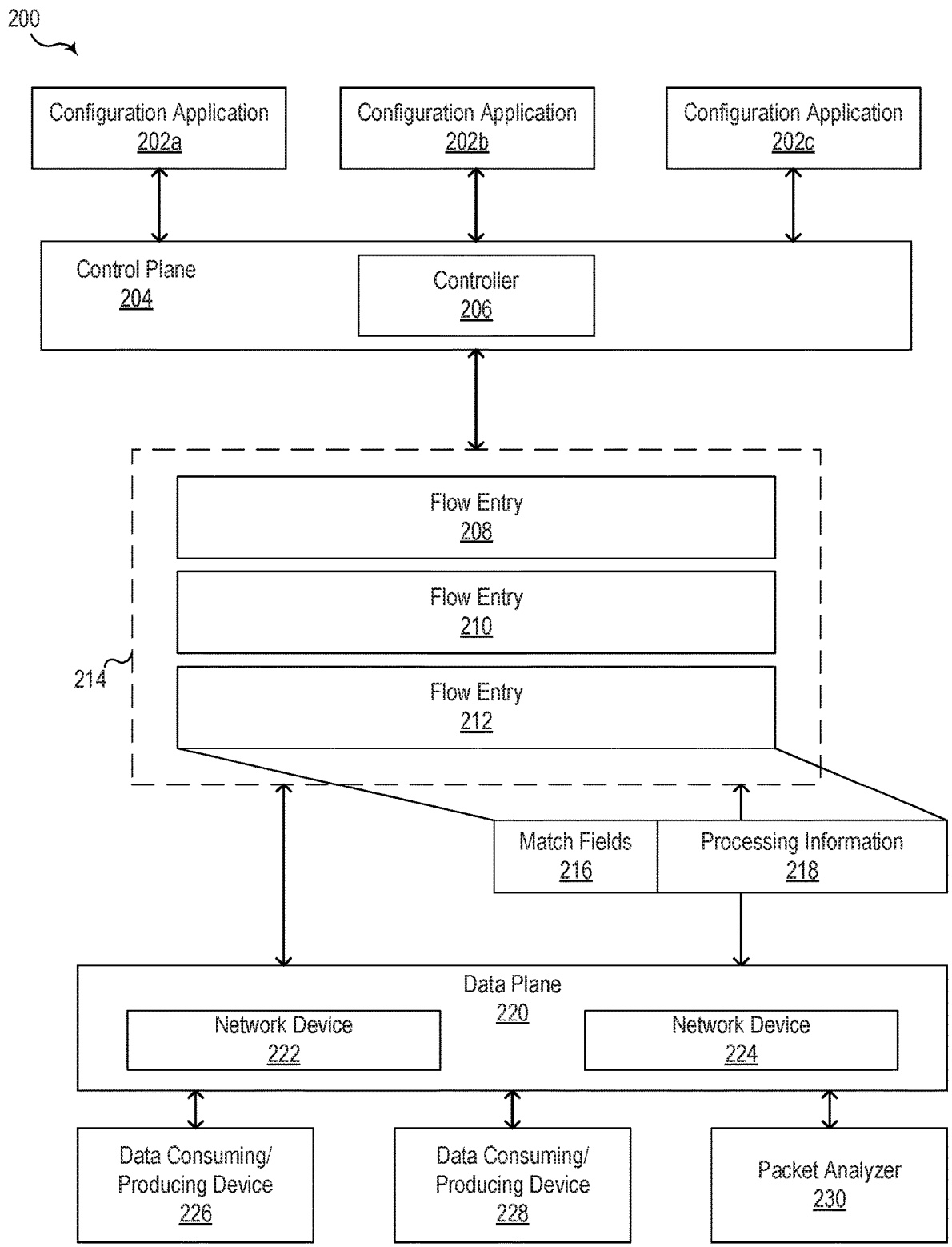
FIG. 2 illustrates an example of a conceptual representation of an SDN architecture, according to one embodiment.

FIG. 2 illustrates an example of a conceptual representation of an SDN architecture including a plurality of configuration applications, a control plane, a data plane, a plurality of data consumers/producer devices, and a high-level diagram of a data packet including packet processing information and data packet content. Applications 202a, 202b, and 202c represent any of a variety of applications for configuring the controller 206 within (or embodying) the control plane 204. Such applications can be tailored to fit a wide variety of system needs.

Pathway 214 may be used to pass information between the data plane 220 and the control plane 204. In some embodiments, pathway 214 may use, for example, the OpenFlow protocol. The OpenFlow protocol operates on and controls how packets are forwarded by configuring the way the switch behaves, represented in FIG. 2 by flow entries 208, 210, and 212. Pathway 214 may thereby direct the traffic to the intended networking devices, such as networking devices 222 and 224 on data plane 220. A detailed look at flow entry 212 illustrates that the flow entry 212 includes match fields 216 and packet processing information 218.

The packet processing information 218 may include, but is not limited to: packet priority, metering information, packet instructions, and packet or flow timeout instructions.

The match fields 216 may be compared to packet information and subsequently used to filter packets into corresponding flows. Match fields may include, but are not limited to: ingress port number; Ethernet source, destination, and type; IP source, destination, and protocol; source port; destination port; and VLAN identification (VLAN ID). An optional match field may be used to match against the VLAN ID of a data packet.

Packets may be tagged or "colored" with information that identifies the origin of the packet, the point at which the packet entered the network, and/or a network path the packet has traversed. Tagging may be done using a variety of methods and techniques, including using VLAN IDs that include source information pushed onto the packet. Each software defined switch on the SDN that is configured to send traffic to a packet analyzer may "tag" packets by pushing a VLAN ID onto that packet. If there is an existing VLAN ID, a second VLAN ID that includes information identifying origin and/or destination information for the packet may be added to (e.g., pushed onto) the packet.

For example, a VLAN ID added by a switch in the SDN may be generated using a combination of known bitmask patterns. For example, a first bitmask pattern may be used to indicate that the network packet should be analyzed by a packet analyzer. The ports on the switch in the SDN may be identified by a unique bitmask pattern. The VLAN ID may be structured to contain information about the source of the packet as well as forwarding information. There may be a variety of methods to match VLANs to corresponding switches and ports, including, but not limited to, using the structure of the combined bitmasks to identify the port and a lookup table with a list of switches and the corresponding VLAN. One of the bits in the bitmask (e.g., a most significant bit or the highest order bit in the bitmask) may identify packets to be inspected and sent to packet analyzer 230. In some embodiments, the highest order bit in the VLAN value is used to prevent the packet from being routed according to the original instructions. Additional packet distinctions may be provided by the bitmask. For instance, specific bitmasks or base masks may be used to designate a packet for port mirroring and/or for forwarding to a DPI system.

The data plane 220 includes networking devices 222 and 224 in communication with one another. In various embodiments, the networking devices 222 and 224 may be embodied as switches, multiplexers, and/or other types of communication devices. The communication links may be embodied as Ethernet, fiber optic, and/or other forms of data communication channels. The data consuming/producing devices 226 and 228 may represent a variety of devices within an electric power transmission and distribution system that produce or consume data.

For example, data consuming/producing devices may be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 220 using a plurality of data flows implemented by controller. Data consuming/producing devices 226 and 228 may be embodied as any of a wide range of devices.

Figure 3:
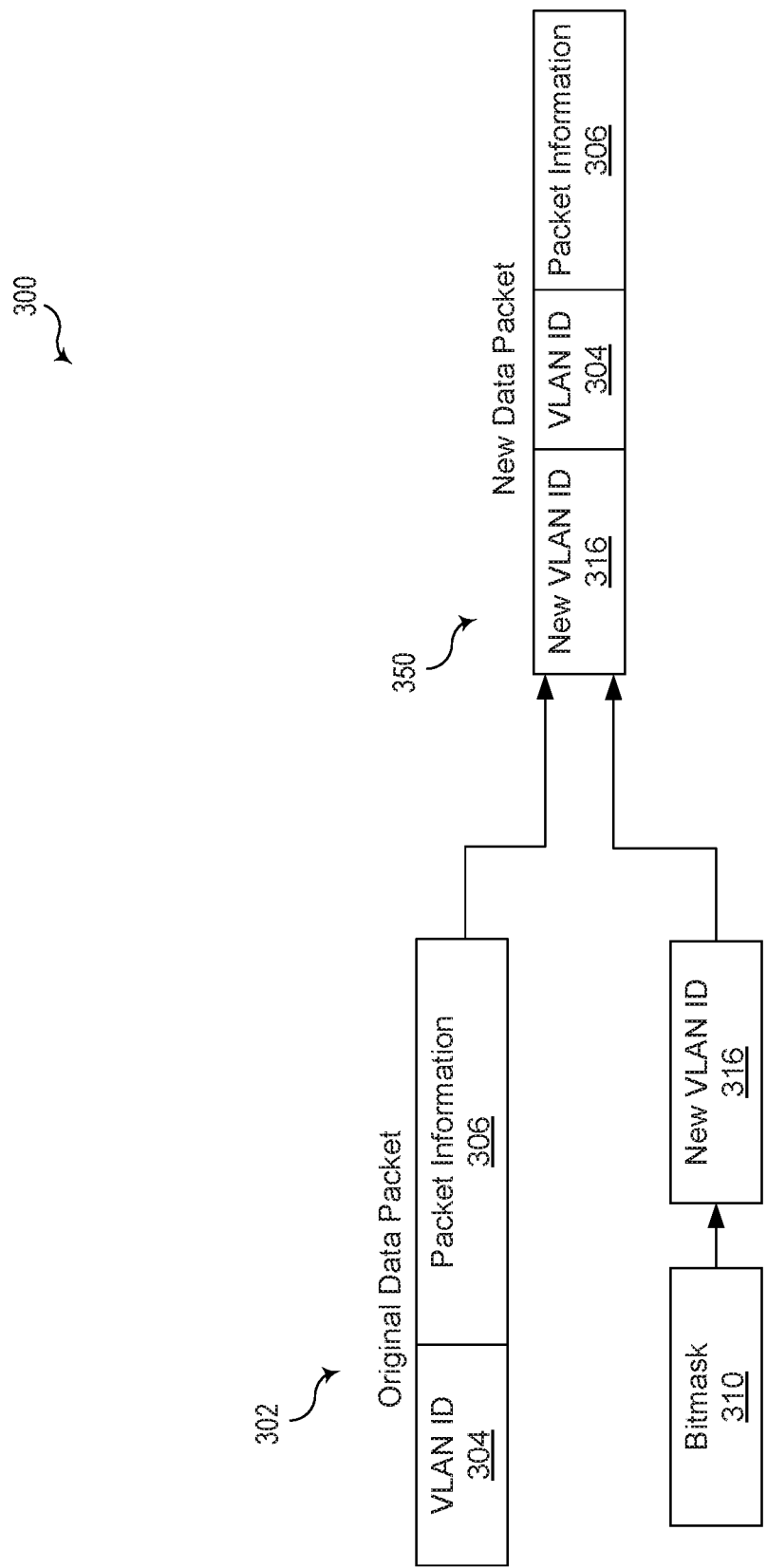
FIG. 3 illustrates an example of a simplified process by which an SDN tags (or "colors") a packet with a VLAN to indicate that the packet should be sent to a packet analyzer and/or provide origination information.

FIG. 3 illustrates an example of a simplified process by which an SDN tags a packet with a VLAN to indicate that the packet should be sent to a packet analyzer. A network device may receive an original data packet 302. The original data packet 302 includes packet information (e.g., a payload). The original data packet 302 may or may not include a VLAN ID 304. An initial packet analysis system may determine that the packet should be further inspected. A bitmask 310 may be used to generate a new VLAN ID 316. The new VLAN ID 316 may be used to tag or "color" the packet to indicate that the packet should be routed to a packet analyzer.

As previously noted, the original data packet 302 may or may not have an existing VLAN ID 304 that would remain intact. As a specific example, a network administrator may choose a bitmask of 0x800 or 100000000000 to indicate that the packet should be sent to the packet analyzer. The most significant bit (bit 12) is high (a 1), which indicates that the packet should be routed to the packet analyzer. Another bitmask, such as 000000001010, may indicate that the $10^{th}$ port on a particular network switch originally received the packet. When these two bitmasks are logically combined with the packet information via, for example, an OR gate, a new VLAN ID 316 may be pushed onto the packet using a write action. The new VLAN ID 316 identifes the packet for forwarding to the packet analyzer and provides specific origin information as well. In this embodiment, the highest order bit in the mask is used by the SDN to identify packets to be sent to the packet analyzer regardless of the other bits in the packet and/or existing VLAN ID(s) 304. Effectively, a new VLAN ID 316, based on one or more bitmasks relating to intended routing and/or origin is added to the original data packet 302. The new data packet 350 includes the packet information 306, the original VLAN ID 304, and the new VLAN ID 316. In some embodiments, different bit masks may be used for different purposes. For example, a first bitmask value may be for routing to a DPI system, a second bitmask value may be used for port mirroring, and a third bitmask value may be used for another type of packet inspection.

As previously described, the bitmask may also provide origin information. The packet identified for further inspection may be received on port three of switch five. As a specific example, switch identification may be encoded in bits 7-11 of the VLAN ID by shifting the binary value identifying the switch by six bits. The binary value of switch five is 101. This value is shifted six bits to the left such that the least significant bit is on bit 7 and ORed with the original bitmask, resulting in the binary value 100101000000. The last six bits may be reserved to encode port identification information of the packet. Since the binary value of port three is 000011, the logically ORed value of the bitmask becomes 100101000011. The most significant bit of the bitmask indicates that the packet should be sent to a packet analyzer. Bits 7-11 encode identification information of the switch from which the packet originates. Bits 1-6 encode identification information of the port from which the packet originates. The combination of these bitmasks are used to generate the new VLAN ID 316, which is then pushed onto the original data packet 302 to form the new data packet 350.

It is appreciated that the number of bits in the bitmask may be larger or smaller depending on the needs of the network. The above example allows for identification of up to 32 networking devices (bits 7-11) and up to 64 ports on each of those networking devices (bits 1-6). In other embodiments, it may be desirable to encode an entire serial number or mac address of each network device from which a packet originates. Standard protocols may restrict the total number of available bits in a VLAN ID. However, the concepts disclosed herein may be adapted and/or expanded to conform to any of a wide variety of protocols and use-cases.

In some embodiments, additional bits may be allocated to encode whether the packet has been mirrored or rerouted from its intended destination. A mirrored packet may be discarded after inspection since the original packet was routed to its originally intended destination. A packet rerouted for inspection may be forwarded to its original destination once packet inspection is complete. Such a packet may be inspected and then returned to the switch and/or port of origin, at which point the new VLAN ID is stripped away and the packet is forwarded to its originally intended destination.

In some embodiments, the system may not need to identify the switch and/or port of origin. In such embodiments, fewer bits may be allocated to the bitmask. For instance, if there are only 25 networking devices in the network and port identification information is not necessary, then the bitmask may include only six bits—a most significant bit to indicate that the packet should be sent to a packet analyzer and five additional bits to encode identification information of the switch from which the packet originates.

The examples above merely represent some of the myriads of possible encoding combinations for tagging or coloring a packet for further analysis and providing some origin information. Alternative tagging or coloring approaches may be utilized based on the target goals of the system.

Figure 4:
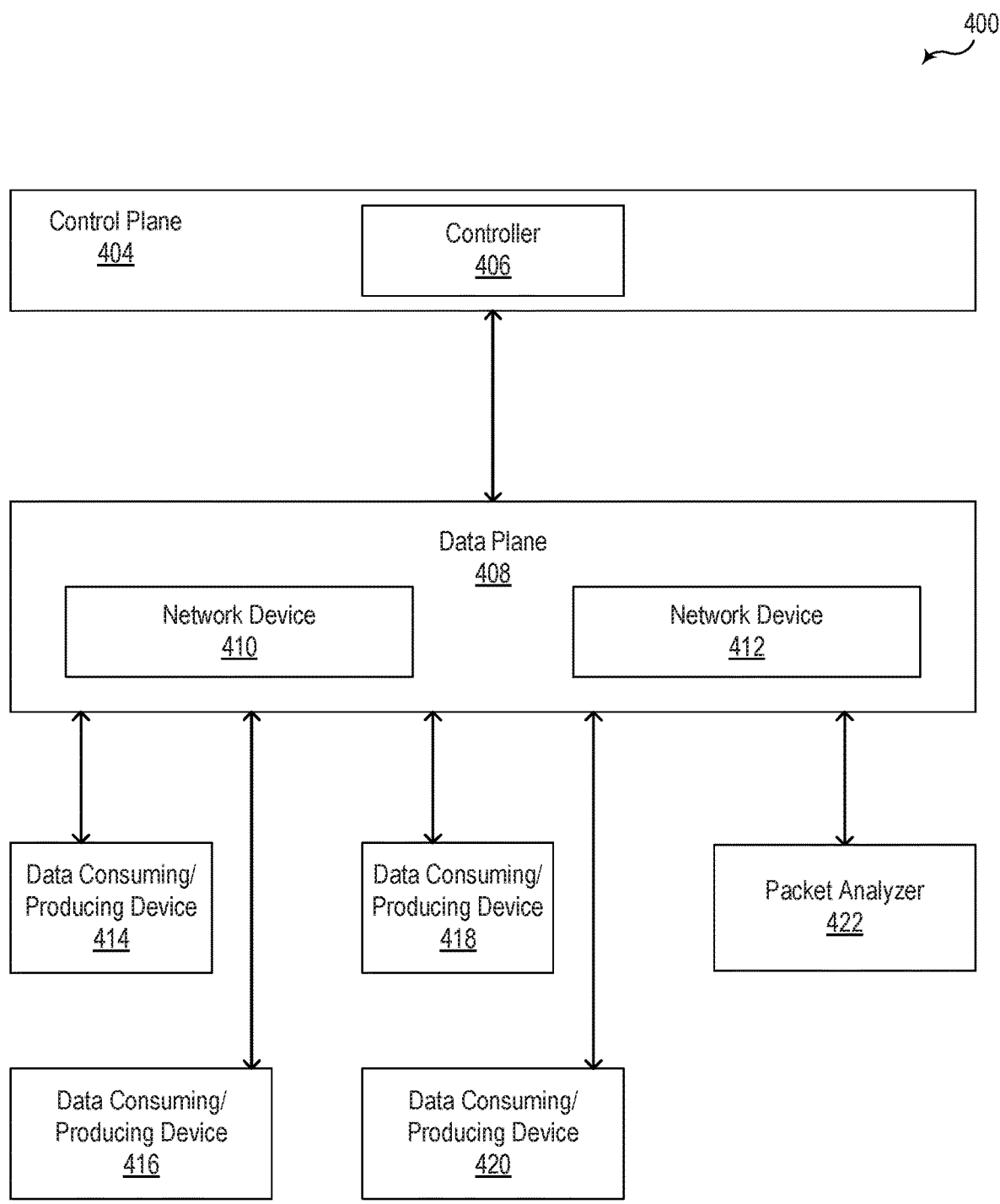
FIG. 4 illustrates another example of a conceptual representation of an SDN architecture.

FIG. 4 illustrates an example of a conceptual representation of an SDN architecture. The illustrated embodiment includes a configuration application, control plane, a data plane, a plurality of data consumers/producer devices, and high-level diagram VLAN packet segmentation and routing. Once a packet has been identified as a packet that should be sent to a packet analyzer, a VLAN value may be assigned to the packet to route the packet to the packet analyzer 422. Network packet routing specifications may be included as well. For example, the VLAN value may indicate that the packet should be routed through designated sniffing ports and/or specify a particular traffic flow for the packet to be routed to the packet analyzer 422.

An initial step may include determining if the packet meets the match criteria to be sent to the packet analyzer 422 (e.g., determining if the most significant bit of the VLAN ID is a 1). If a packet meets the match criteria, an action for this match rule may be to send the packet to the packet analyzer 422 instead of sending it to the original destination. Packets that do not have a VLAN ID that satisfies the match rule (e.g., the most significant bit is not a 1), may be routed to their original destination (e.g., one of data consuming/producing devices 414, 416, 418, and 420).

In some embodiments, packet inspection may be a one-way function in which packets are inspected and discarded. Port mirroring may be used to ensure that such inspections do not result in packet loss of the data plane communications. Other forms of packet inspection may be bi-direction and result in packets be returned to their origin and/or routed to their intended destination after inspection. For example, when an IDS is configured on the network, the packets that are sent to the IDS may be copies of the packets from a specific port on a specific networking device (e.g., accomplished via port mirroring). The copied packets are typically discarded after they are analyzed.

In contrast, a DPI system may intend for a packet to be sent back to its source after inspection. Of course, if the packet is identified as undesirable, the packet may be discarded and/or other protective actions may be taken. Otherwise, if the DPI system determines that the packet is allowed on the network, the packet may be sent back to the switch of origin and egressed to its originally intended destination. The action of sending a packet from packet analyzer 422 back to the originating ingress switch (e.g., 410) may be implemented via a set of flow match rules that are the opposite direction of typical flow match rules. The next steps of the packet's route are being sent back through the data plane 408. When the packet arrives back to its origin, the packet analyzing VLAN ID may be removed from the packet, and the packet may be processed normally. To facilitate this action, the typical flows for packets that are tagged to be sent to a deep packet analyzer may be in table 2, or later, so that the write action for the match can be to send the packet for further processing.

Figure 5:
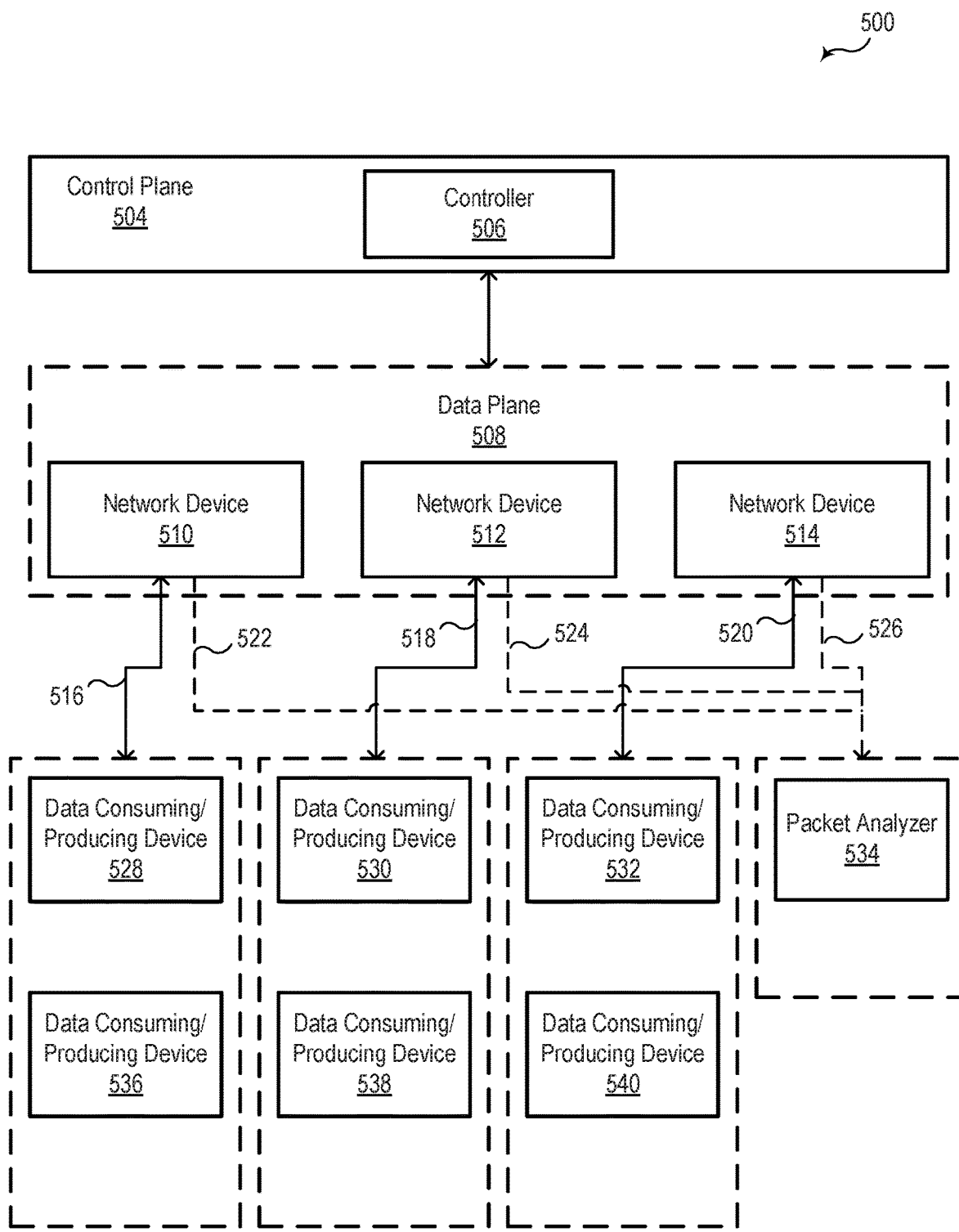
FIG. 5 illustrates a conceptual representation of an SDN architecture including a configuration application, a control plane, a data plane, a plurality of data consumers/producer devices, and selectively enabled port mirroring functionality.

FIG. 5 illustrates another example of a conceptual representation of an SDN architecture 500 that includes a control plane 504, a data plane 508, a plurality of data consumers/producer devices 528-540, and a selectively enabled port mirroring functionality. A packet may be passed from one data producing device 528-540 to another data consuming device 528-540 via one or more network devices (510, 512, and/or 514) within the data plane 508. The packet may enter the data plane 508 of the SDN. Data plane 508 may contain a plurality of network devices 510-514. Each network device may have designated routing pathways 516-520. Per the systems and methods described herein, selective port mirroring may be programmatically enabled for one or more (or all) ports within the SDN. Thus, each networking device may be selectively enabled to mirror their traffic to a packet analyzer 534 through pathways 522-526. The selective traffic mirroring allows for dynamic granular data gathering of the traffic of a single flow from a single port. This process can be done remotely and on an as-needed basis without interrupting the normal network flow.

The specifics of packet routing may depend on the needs of the network administrator. If a dedicated port is used to determine which packets should be further analyzed, the incoming traffic on that "sniffing" port may then be routed out towards a packet analyzer. If other traffic shares the sniffing port, the receiving switch may have a match rule that uses the bitmask to identify packets tagged for inspection that should be routed to a packet analyzer. With an SDN, it may be possible for network devices 510-514 to use the first, most significant bit to determine if packets need to be sent to a packet analyzer. This matching process may include rate limiting features that limit the total amount of traffic sent to the packet analyzer. For instance, if the analyzer becomes overwhelmed with traffic, some of the packets that were originally designated for the packet analyzer may simply be discarded.

Figure 6:
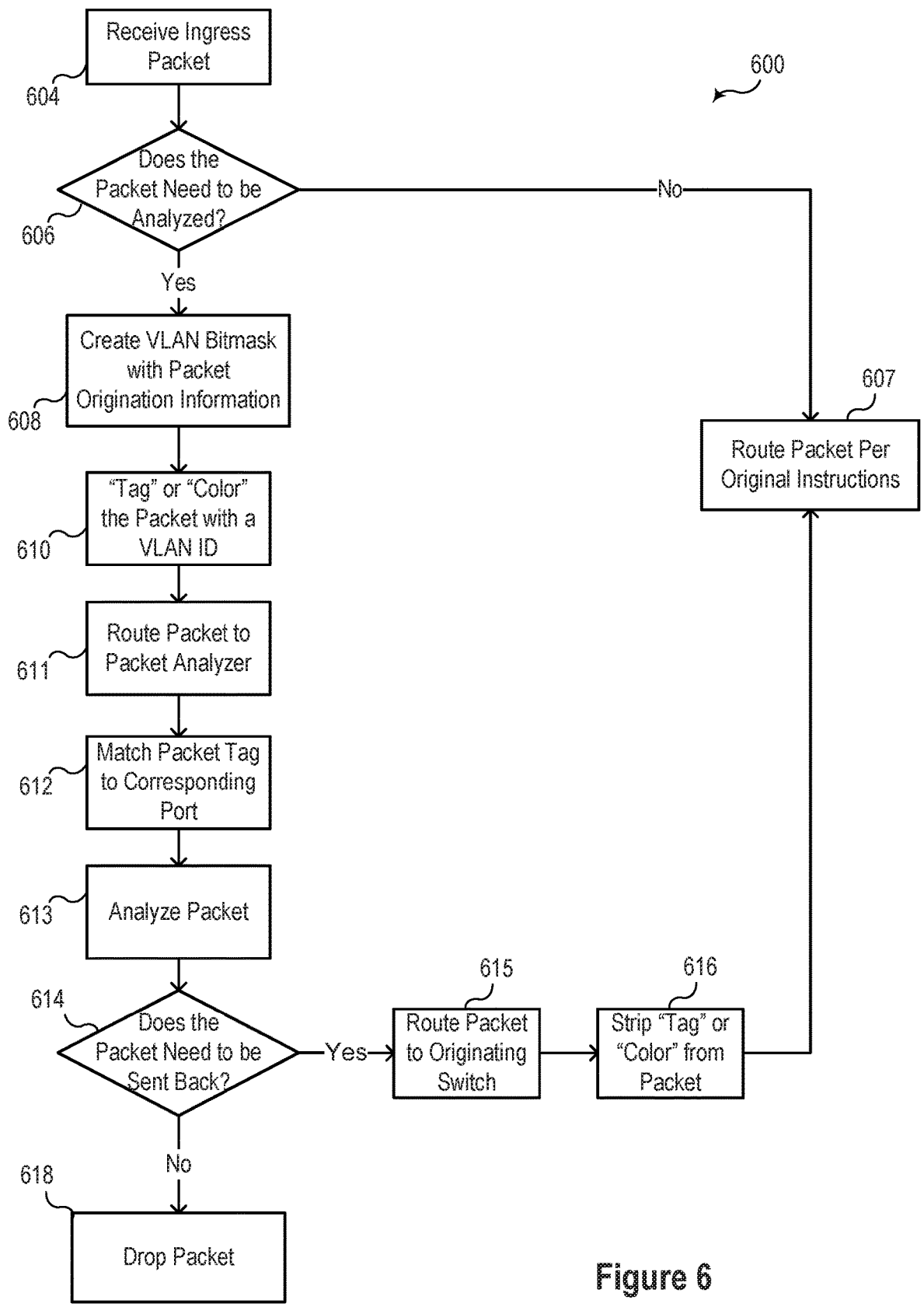
FIG. 6 illustrates a flowchart of an example of a method for processing a packet through an SDN for DPI packet analysis.

FIG. 6 illustrates a flowchart of an example of a method for processing a packet through an SDN configured for packet analysis. An ingress packet is received on the network, at 604. A component of the system, such as a networking device, may determine if the packet meets the match criteria for packet analyzation at 606. If the packet is not identified for transmission to the packet analyzer, the packet may be routed according to existing instructions at 607. The method may then begin again by receiving another ingress packet, at 604.

However, if the packet meets the match criteria, a VLAN ID may be created, at 608. The most significant bit of the VLAN ID may "tag" or "color" the packet for automatic routing by subsequent networking device to the packet analyzer. Other bits of the VLAN ID may be used to identify origin information of the data packet (e.g., switch and/or port identification information). The VLAN ID is added to the data packet (and any existing VLAN tags), at 610, to route the packet to the packet analyzer, at 611.

In some embodiments, the packet may be routed to the packet analyzer, at 612, through any number of networking devices and/or dedicated ports. Each of the networking devices along the way may use a match rule to determine that the packet is intended for the packet analyzer without regard to the original packet routing instructions. For instance, subsequent networking devices may determine that the most significant bit of the VLAN ID is a 1, and so automatically route the packet to the packet analyzer without further analysis or inspection. The packet analyzer may then analyze the packet, at 613. In some embodiments, the system may then determine if the packet needs to be sent back to its origin at 614. If it does not, the packet may be discarded, at 618. If it does need to be sent back, the packet may be routed back to its origin, at 615. The system may strip the "tag" or "coloring" from the packet, at 616, and then route the packet per the packet's original instructions, at 607. In some embodiments, the packet may simply be discarded, at 618 without the step of determining if the packet should be sent back.

Figure 7:
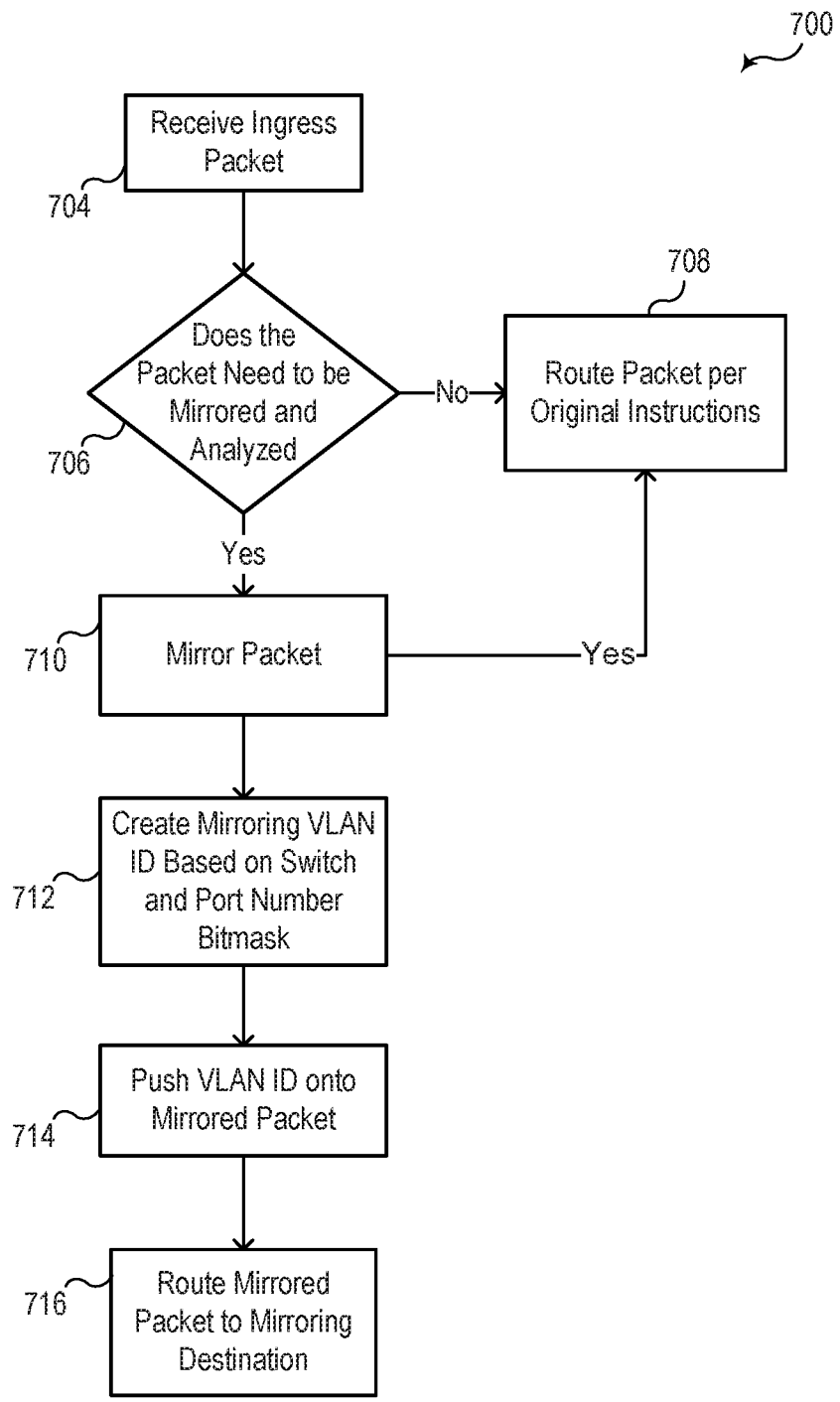
FIG. 7 illustrates a flowchart of an example of a method for processing a packet through an SDN configured for packet analysis using port mirroring.

FIG. 7 illustrates a flowchart of an example of a method for processing a packet through an SDN configured for packet analysis using port mirroring. The system may receive a packet, at 704. The system may determine if the received packet should be copied (mirrored) and further analyzed, at 706. If no further analysis is required, the packet is not mirrored and is simply routed according to the existing, original routing instructions, at 708. If, however, the packet requires further analysis, the packet may be mirrored, at 710. The original packet may be routed to its originally intended destination, at 708. A mirroring VLAN ID may be created, at 712, that identifies the packet as a mirrored packet, identifies the packet for routing to a IPS or DPI system, and/or identifies the switch and/or port where the packet was initially received. The VLAN ID is pushed onto the mirrored packet, at 714, and the mirrored packet is routed, at 716, to the mirroring destination (e.g., the IPS or DPI system). The mirrored packet may be discarded following analysis.

The methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or nontransitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application specific integrated circuits (ASICs), and/or as hardware/software combinations.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A method of packet analysis via in-band transport of network packets in a software-defined network, comprising:
   receiving, via one of a plurality of input ports on a first networking device within a software-defined network (SDN), an original network packet;
   identifying, via the first networking device, the original network packet for forwarding to a packet analyzer connected to the SDN;
   mirroring the original network packet received by the first networking device to generate a mirrored network packet;
   writing, to the mirrored network packet via a bit writer, a VLAN ID that identifies:
      (i) The mirrored network packet for analysis by the packet analyzer,
      (ii) the first networking device that received the original network packet, and
      (iii) which input port of a plurality of input ports on the first networking device received the original network packet;
   forwarding the original network packet out of an egress port to a first of a plurality of subsequent networking devices within the SDN;
   forwarding the mirrored network packet to a second of the plurality of subsequent networking devices within the SDN via a first dedicated sniffing port dedicated to forwarding packets identified for analysis by the packet analyzer;
   reading, by subsequent networking devices within the SDN, the VLAN ID of the mirrored network packet identifying the mirrored network packet for analysis by the packet analyzer;
   forwarding, by one of the subsequent networking devices within the SDN, the mirrored network packet to the packet analyzer for analysis via a second dedicated sniffing port dedicated to forwarding packets identified for analysis by the packet analyzer:
   inspecting the mirrored network packet via the packet analyzer; and discarding the mirrored network packet after inspection.

2. The method of claim 1, wherein at least one bit of the VLAN ID is reserved for identifying the mirrored network packet for forwarding to the packet analyzer.

3. The method of claim 2, wherein the network packet includes an existing VLAN tag, and wherein writing the VLAN ID to the mirrored network packet comprises pushing another VLAN tag that includes the VLAN ID onto the network packet without modifying the existing VLAN tag.

4. The method of claim 1, wherein the packet analyzer comprises a deep packet inspection (DPI) system.

5. The method of claim 1, wherein the packet analyzer comprises an intrusion detection system (IDS).

6. The method of claim 1, wherein the SDN comprises an Ethernet-based SDN.

7. A software-defined network, comprising:
a software-defined network (SDN) controller to selectively implement packet analysis flow rules on each of a plurality of networking devices connected via a network to a packet analyzer;
a first of the plurality of networking devices to
receive an original network packet via one of a plurality of ports,
identify the original network packet for inspection via the packet analyzer, and
mirror the original network packet to generate a mirrored network packet;
a bit writer to write a VLAN ID to the mirrored network packet identifying the mirrored network packet for inspection via the packet analyzer,
at least the first networking device that received the original network packet, and which of the plurality of ports on the first networking device received the original network packet; and
a packet forwarding module of the first networking device to:
forward the mirrored network packet to the packet analyzer via dedicated sniffing ports on each of at least some of the plurality of networking devices in the network, and
forward the original network packet to an intended destination via egress ports of at least some of the plurality of networking devices in the network.

8. The software-defined network of claim 7, wherein the selectively implementable packet analysis flow rules allow for selective port mirroring of any port on at least one of the plurality of networking devices.

9. The software-defined network of claim 7, wherein network packet comprises an existing VLAN tag, and wherein the bit writer is configured to write the VLAN ID identifying the original network packet for inspection by pushing an additional VLAN tag onto the mirrored network packet that includes the VLAN ID, without modifying the existing VLAN tag.

10. The software-defined network of claim 7, wherein the bit writer is configured to write the VLAN ID identifying the mirrored network packet for inspection by pushing a VLAN tag containing the VLAN ID onto the network packet.

* * * * *